United States Patent [19]

Kawashita et al.

[11] Patent Number: 5,149,366

[45] Date of Patent: Sep. 22, 1992

[54] DISAZO COMPOUND AND INK COMPOSITION CONTAINING THE SAME

[75] Inventors: Hideo Kawashita; Mituhiro Ohta; Kazuya Ogino, all of Osaka, Japan

[73] Assignees: Sumitomo Chemical Company, Limited; Taoka Chemical Company, both of Osaka, Japan

[21] Appl. No.: 773,501

[22] Filed: Oct. 9, 1991

[30] Foreign Application Priority Data

Oct. 18, 1990 [JP] Japan .................. 2-281297

[51] Int. Cl.$^5$ .................. C09D 11/02; C07C 245/08
[52] U.S. Cl. .................. 106/22; 534/829; 534/833; 534/836
[58] Field of Search .................. 106/20, 22; 534/829, 534/833, 836

[56] References Cited

U.S. PATENT DOCUMENTS

| | | | |
|---|---|---|---|
| 3,754,923 | 8/1973 | Stauner et al. | 534/829 |
| 4,804,411 | 2/1989 | Eida et al. | 106/22 |

FOREIGN PATENT DOCUMENTS

| | | |
|---|---|---|
| 0312004 | 4/1989 | European Pat. Off. |
| 3734528 | 5/1989 | Fed. Rep. of Germany |
| 2184742 | 7/1987 | United Kingdom |

OTHER PUBLICATIONS

Methoden Organishcen Chemie vol. VI/3, part 3, Houben–Weyl "Sauerstoffverbindungen" pp. 21–24 (1965).

111 Chemical Abstracts 216 123a (1989).

*Primary Examiner*—Mark L. Bell
*Assistant Examiner*—Helene Klemanski
*Attorney, Agent, or Firm*—Cushman, Darby & Cushman

[57] ABSTRACT

A disazo compound of the formula (I) in the free acid form,

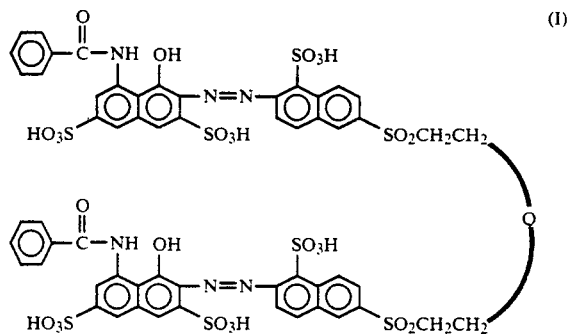

and an ink jet recording ink composition containing the same are provided, and the composition is superior in stability during storage or use, heat resistance, image clearness, water resistance and light fastness, and has a desirable tint as a red color.

7 Claims, No Drawings

DISAZO COMPOUND AND INK COMPOSITION CONTAINING THE SAME

The present invention relates to a disazo compound and an ink composition containing the same useful for ink jet recording.

A water-based ink composition useful for ink jet recording usually comprises dyes, organic solvents and water. In order to obtain good ink jet recording, the ink composition is required to meet various needs.

For example, physical properties of the ink composition such as viscosity, surface tension, specific electric conductivity, density and pH are to be adequately controlled within a desired range so as to apply the composition for any means of generating ink droplets and controlling the flying direction of the ink droplets.

Moreover, these physical properties are required to be kept unchangeable for a long period of time. For example, the ink composition must not produce precipitates due to chemical changes or the like during a long time storage or use or at the rest time of recording operation. When produced, the precipitates easily clog a jet nozzle of an ink jet recording apparatus which has a diameter of as small as 10–60 μm to interrupt the jetting of ink droplets. Even when the composition produces no precipitate, but solid or cohesive matters, they easily adhere to the nozzle to lower the recording ability, jetting stability, and jetting response.

Further, high heat resistance is also required particularly for a thermal energy-utilizing ink jet system which has been developed recently.

Besides, it is asked for that recorded images are sufficiently high in the degree of contrast and clearness and excellent in water resistance and light fastness.

As red dyes for the ink composition, direct dyes, acid dyes and reactive dyes such as, C.I. Direct Red 9, C.I. Acid Red 14, 34, 37 and 249, and C.I. Reactive Red 24, 35, 111, 114, 174, 180 and 184 have been used.

In the Japanese Patent Kokai (Laid-Open) No 123,866/1989, azo dyes having a group of —SO₂—CH₂ CH₂ OH or —SO₂ CH=CH₂ are disclosed as useful for the ink jet recording ink.

However, the red dyes heretofore used are not yet satisfactory for the ink jet recording ink.

The present inventors have undertaken extensive studies to find ink compositions meeting needs described above and useful for the ink jet recording, and as a result have attained the present invention.

The present invention provides a disazo compound represented by the following formula (I) in the free acid form,

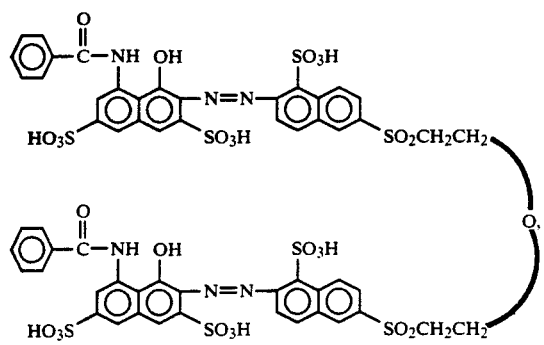

and also provides an ink composition comprising the disazo compound, a water soluble organic solvent and water.

The disazo compound of the formula (I) can be readily produced, for example, by treating a vinylsulfone compound represented by the formula (II) in the free acid form,

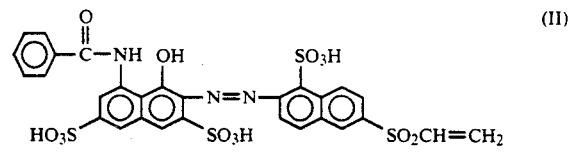

with an alkali such as sodium bicarbonate in an aqueous medium preferably at an elevated temperature.

The compounds of the above formulae (I) and (II) are usually in the form of salts, for example, salts of alkali metals such as sodium, potassium, etc., ammonium salts, and organic amine salts such as ethanolamine, propanolamine, etc.

The water soluble organic solvents used in the present invention include, for example, polyhydric alcohols, cellosolves, carbitols, etc. Examples thereof are ethylene glycol, diethylene glycol, triethylene glycol, tetraethylene glycol, propylene glycol, glycerol, polyethylene glycol, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and the like. Dimethylformamide, N-methyl-2-pyrrolidone, alcohols, alkanolamines and the like may also be used. These solvents can be used singly or in a mixture thereof.

In the preparation of the present ink composition, the disazo compound of the formula (I), the water soluble solvent and water are used preferably in the amount of 0.5 to 20 parts by weight, more preferably 1 to 15 parts by weight, 1 to 60 parts by weight, and 20 to 90 parts by weight, respectively, based on 100 parts by weight of the ink composition. With less than 0.5 part by weight of the disazo compound, coloration is insufficient, and with more than 20 parts by weight thereof, precipitate may occur for a long period of time.

The ink composition of the present invention may contain other dye compounds conventionally used for the ink composition, to the extent that the characteristics of the present composition are not deteriorated. The present composition may also contain a hydroxyethylsulfone compound represented by the following formula (III) in the free acid form,

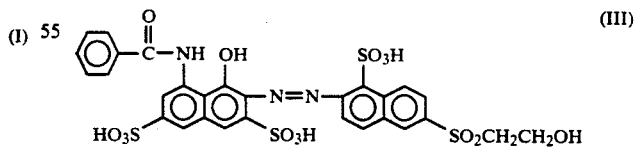

which is a by-product formed during the course of the production of the disazo compound (I), and/or a vinylsulfone compound of the formula (II) mentioned above.

In order to provide more excellent characteristics, various kinds of additives conventionally used may be used for the ink composition of the present invention. The additives include, for example, antiseptics or fungicides such as sodium dehydroacetate, dicyclohexylammonium nitrite and the like, ultraviolet ray absorbers, viscosity adjusters, surface tension adjusters, pH adjusters, specific resistivity adjusters, infrared absorbers, penetrants and the like.

The ink composition of the present invention can be prepared by dissolving the disazo compound of the formula (I) and the water soluble organic solvent in water, if desired, together with various additives as mentioned above, preferably at an elevated temperature, and passing the solution before or after cooling through a filtering membrane having holes of a fine diameter to separate undissolved matters.

The water-based ink composition thus obtained in accordance with the present invention is useful for the ink jet recording, has a desirable tint as a red color and can meet various needs such as stability during storage or use, heat resistance, image clearness, water resistance, light fastness and the like.

The present invention is explained in more detail with reference to the following Examples, which are only illustrative but not limitative.

EXAMPLE 1

In 100 ml of water was dissolved 9.2 g of sodium salt of the vinylsulfonic dye represented by the formula (II). After addition of 5 g of sodium bicarbonate at 60° C., the solution was kept at a temperature of 60°-65° C. under stirring for 3 hours to allow the reaction to proceed.

Then, the mixture was cooled 30°-35° C., and the inorganic salt was removed using a reverse osmotic membrane. After the color by-product was separated by column chromatography, the solution was subjected to hot wind drying to obtain 6.5 g of sodium salt (red powder) of the compound (dye) represented by the formula (I).

The dye had a λmax of 555 nm. The elemental analyses of the pure specimen are as follows.

|  | C | H | N | S | Na |
|---|---|---|---|---|---|
| Theoretical (%) | 42.34 | 2.31 | 5.11 | 15.57 | 8.39 |
| Found (%) | 42.3 | 2.2 | 5.0 | 15.7 | 8.2 |

EXAMPLE 2

In 100 ml of water was dissolved 9.8 g of potassium salt of the vinylsulfonic dye represented by the formula (II). After addition of 6.5 g of potassium bicarbonate at 60° C., the solution was kept at a temperature of 60°-65° C. under stirring for 3 hours to allow the reaction to proceed.

Then, the mixture was cooled to 30°-35° C., and the salt was removed using a reverse osmotic membrane. After the color by-product was separated, the solution was subjected to hot wind drying to obtain 7.0 g of potassium salt (red powder) of the compound (dye) represented by the formula (I).

The dye had a λmax of 555 nm. The elemental analyses of the pure specimen are as follows.

|  | C | H | N | S | K |
|---|---|---|---|---|---|
| Theoretical (%) | 40.00 | 2.18 | 4.83 | 14.71 | 13.45 |
| Found (%) | 39.9 | 2.1 | 4.8 | 14.7 | 13.3 |

Using the compounds obtained in Examples 1 and 2, ink jet recording ink compositions were prepared as follows. That is, the ink composition was prepared by mixing the disazo compound, water-soluble organic solvents, various additives and water in the proportion as shown in each of the following Examples, heating the mixture to a temperature of approximately 50° C. under stirring to make a solution, and then filtering the solution through Teflon membrane filter having 0.22 μm hole diameter, thereby to obtain a water base recording liquid, which had a pH of 8-10, a viscosity of 1.5-2.5 (cp), and a surface tension of 35-60 (dyn/cm).

EXAMPLE 3

Compound of Example 1: 2.5%
Glycerol: 3.0%
Diethylene glycol: 10.0%
Sodium dehydroacetate: 0.1%
Ion exchanged water: 84.4%

EXAMPLE 4

Compound of Example 1: 2.0%
Triethylene glycol: 5.5%
Polyethylene glycol #200: 5.0%
Sodium dehydroacetate: 0.1%
Ion exchanged water: 87.4%

EXAMPLE 5

Compound of Example 2: 3.0%
Polyethylene glycol #200: 8.0%
Diethylene glycol: 3.0%
Sodium dehydroacetate: 0.1%
Ion exchanged water: 85.5%

The water-based ink composition obtained in Examples 3 to 5 were superior in stability during preservation or while being used, thermal stability, image clearness, water resistivity and light fastness, these being the requirements for ink jet recording, and had a desirable tint as red color.

We claim:

1. A disazo compound represented by the following formula (I) or salt thereof,

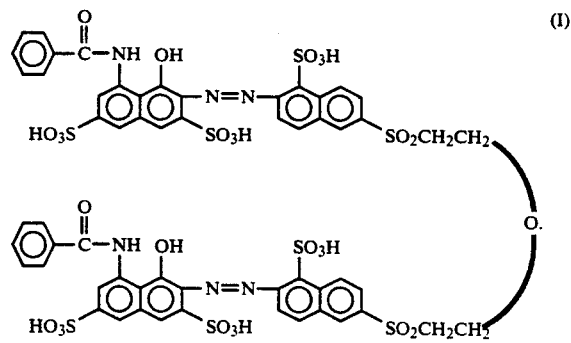

2. An ink composition which comprises a disazo compound represented by the following formula (I) or salt thereof,

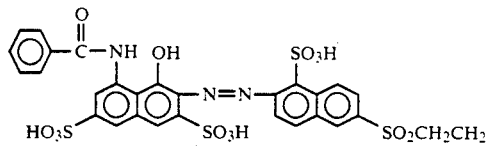

(I)

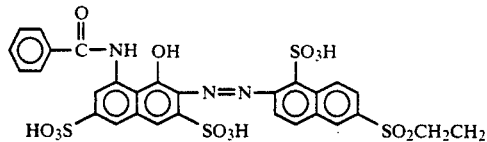

a water-soluble organic solvent and water.

3. A disazo compound according to claim 1 wherein the said salt is selected from the group consisting of sodium salt, potassium salt, ammonium salt, ethanolamine salt and propanolamine salt.

4. An ink composition according to claim 2 wherein said salt is selected from the group consisting of sodium salt, potassium salt, ammonium salt, ethanolamine salt, and propanolamine salt.

5. An ink composition according to claim 2 wherein said composition contains hydroxyethylsulfone represented by the following formula (III)

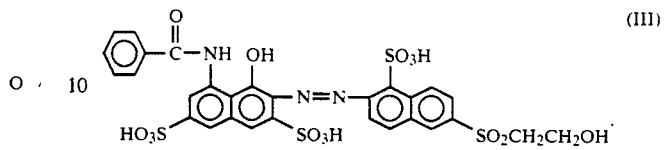

(III)

6. An ink composition according to claim 2 containing 0.5–20 parts by weight of disazo compound or salt thereof, 1 to 60 parts by weight of water soluble solvent and 20 to 90 parts by weight of water, based on 100 parts by weight of said ink composition.

7. An ink composition according to claim 6 wherein said composition contains 1 to 15 parts by weight of disazo compound or salt thereof.

* * * * *

UNITED STATES PATENT AND TRADEMARK OFFICE
CERTIFICATE OF CORRECTION

PATENT NO. : 5,149,366

DATED : September 22, 1992

INVENTOR(S) : Kawashita et al

It is certified that error appears in the above-identified patent and that said Letters Patent is hereby corrected as shown below:

In column 5, lines 2-14, the Formula should be deleted and therefor substitute the following Formula:

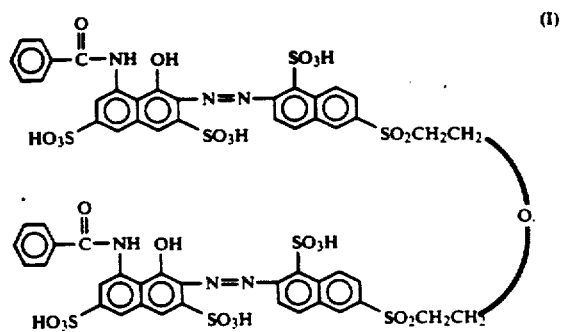

Signed and Sealed this

Ninth Day of November, 1993

Attest:

BRUCE LEHMAN

Attesting Officer

Commissioner of Patents and Trademarks